United States Patent [19]
Solomon

[11] 3,790,880
[45] Feb. 5, 1974

[54] VARIABLE COUPLING DC SUPERCONDUCTING TRANSFORMER

[75] Inventor: Peter R. Solomon, Bloomfield, Conn.

[73] Assignee: United Aircraft Corporation, East Hartford, Conn.

[22] Filed: Jan. 9, 1967

[21] Appl. No.: 608,175

[52] U.S. Cl............................ 323/44 F, 336/DIG. 1
[51] Int. Cl........................... G05f 7/00, H01f 10/00
[58] Field of Search............ 323/44 F; 307/245, 306; 336/15 S, DIG. 1; 330/62

[56] References Cited
UNITED STATES PATENTS

| 2,946,030 | 7/1960 | Slade | 307/245 X |
| 3,143,720 | 8/1964 | Rogers | 336/155 |
| 3,214,679 | 10/1965 | Richards | 323/44 F |
| 3,275,843 | 9/1966 | Meyerhoff | 323/44 X |
| 3,283,168 | 11/1966 | Garwin | 307/245 X |
| 3,394,317 | 7/1968 | Giaever | 323/44 F X |

OTHER PUBLICATIONS

"Superconductivity and Some of its Applications" by Dr. Ahmed el Bindari et al., Wire and Wire Products, January 1967, Vol. 42, No. 1.
"Physical Review Letters," Vol. 15, No. 21, Nov. 22, 1965, I. Giaever Article; Pages 825–827.
"IEEE Spectrum," Sept. 1966, I. Giaever Article; Pages 117–122.

Primary Examiner—Gerald Goldberg
Attorney, Agent, or Firm—Donald F. Bradley

[57] ABSTRACT

A dc transformer consisting of two Type I superconducting strips separated by an insulating layer, the assembly being situated in a magnetic field and cooled below the transition temperature of the superconductors. The coupling between the primary and secondary may be varied by varying the strength of the magnetic field.

2 Claims, 3 Drawing Figures

VARIABLE COUPLING DC SUPERCONDUCTING TRANSFORMER

This invention relates to a dc transformer, and in particular to a variable coupling dc transformer utilizing Type I superconducting material. This transformer will perform the same functions as any ordinary electrical transformer such as voltage step-up, voltage step-down, and electrical isolation between primary and secondary, for a zero frequency, i.e., direct current, where ordinary transformers cannot be used.

The variable coupling dc transformer has the additional advantage that the coupling between the primary and secondary may be varied from some maximum value to zero by simply varying the strength of a magnetic field.

It is known in the art that potential differences exist across current carrying Type II superconductors in the mixed state and Type I superconductors in the intermediate state. It has now been shown that magnetic coupling takes place between two adjacent Type II superconductors in the mixed state. See for example I. Giaever, Physical Review Letters, Vol. 15, p. 825 (1965), wherein is described an experiment in which a film of Type II Sn a few thousand angstroms thick is evaporated onto a glass slide, covered with a thin film of silicon monoxide about 100 A thick, and finally coated with an evaporated film of Sn of 500–1,000 A. When both films are superconducting, and a dc current is passed along the first film, a dc voltage is seen in both films.

This invention describes a similar device which utilizes Type I superconductors in the intermediate state, and produces a dc transformer which is superior to the prior devices in that it operates in a wide range of magnetic fields and temperature values, and does not require extremely thin insulating layers.

It is therefore an object of this invention to produce a dc transformer utilizing Type I superconductor material in the intermediate state.

A further object of this invention is a dc transformer in which the coupling between the primary and secondary may be varied.

These and other objects of the invention are more fully explained in the accompanying description and claims, read in conjunction with the accompanying drawings, in which:

Superconductors are usually divided into two classes, referred to as Type I and Type II. A Type I superconductor is the "classical" superconductor, which is characterized by a zero resistance and by the fact that it exhibits a Meissner effect, i.e., when a long thin cylinder of this material is placed in a magnetic field parallel to the axis of the cylinder, the magnetic field inside the superconductor itself is always zero. If the applied field is increased until the so-called critical field is reached, the Type I superconductor reverts to the normal state through a first order phase transition. When a bulk sample of a Type I superconductor has a sufficiently high demagnetizing coeficient, a flat plate in a perpendicular magnetic field, for example, then there is a range of fields below the critical field where the field penetrates the material and the bulk is neither normal nor superconducting. This is called the intermediate state. This type includes, for example, lead, tin and indium. It is well known in the art that the intermediate state consists of a mixture of normal and superconducting domains. The size of the domains is related to the thickness of the flat plate. Domain size may range from several thousand angstroms for films of about 10,000 angstroms thickness, to millimeters for plates of centimeters thickness.

Type II superconductors include alloys such as BiPb, PbIn, $Nb_3Sn$, and also possibly pure niobium. Just as with Type I superconductors, a long cylinder of Type II will exclude all the magnetic field from its interior when the applied magnetic field is low. Similarly, in a sufficiently high magnetic field, the Type II superconductor also becomes normal; however, there is an intermediate range of fields even for a long thin cylinder in which the magnetic field penetrates and the bulk is neither normal nor superconducting. This is called the mixed state.

Figure 1:
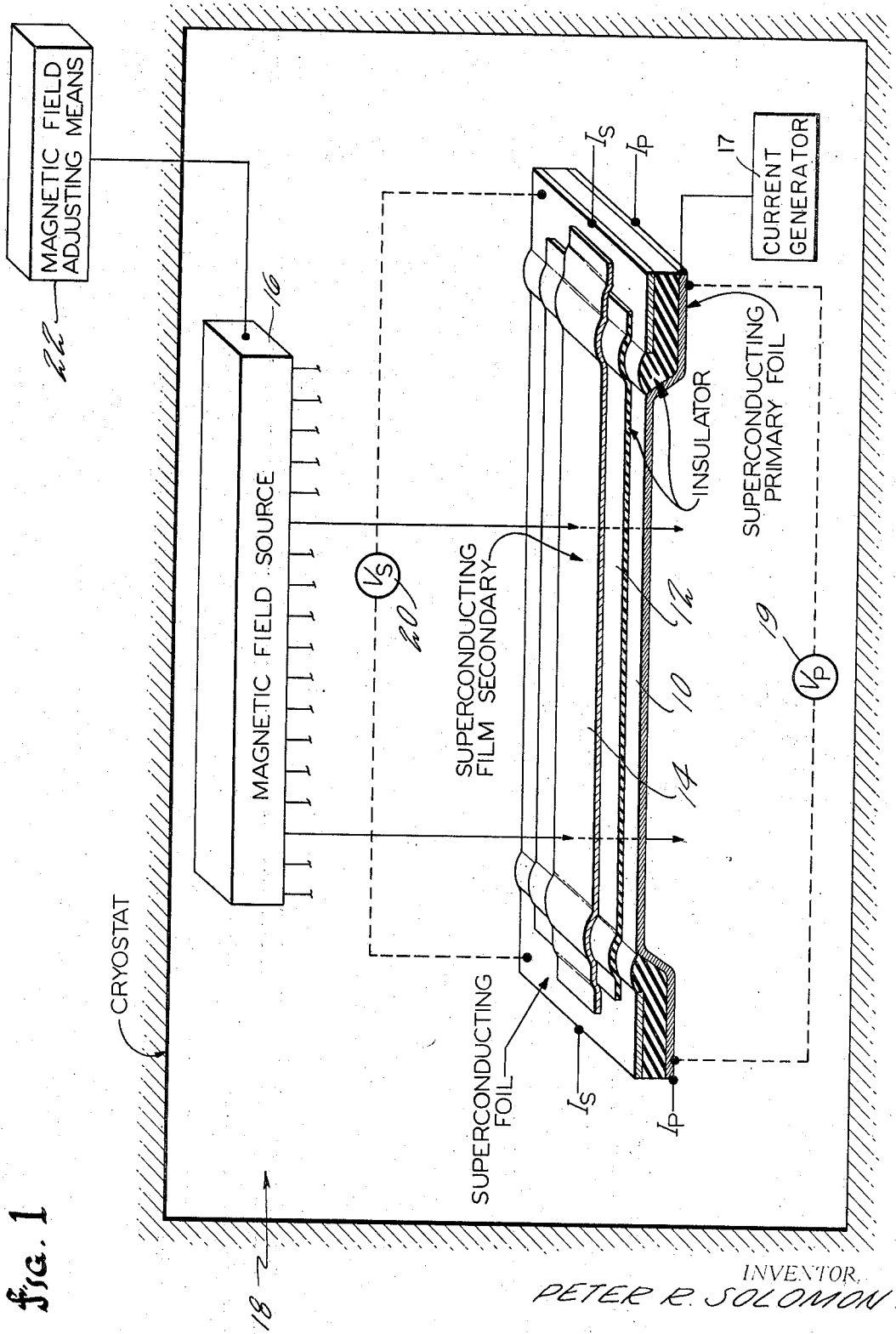
FIG. 1 shows a typical geometry for the dc transformer of this invention.

A preferred embodiment of the variable coupling dc superconducting transformer is shown in FIG. 1. It is a sandwich consisting of two Type I superconducting strips separated by a thin insulating layer. The lower superconductor is called the primary, and the upper superconductor is called the secondary.

FIG. 1 shows a layer of lead (Pb) or tin (Sn) foil 10 having a thickness between 1/40 mm. and 2 1/2 mm. An electrical insulating layer 12 such as an evaporated polymer film between 500–20,000 A thick is deposited on top of the primary foil 10. A secondary film 14 of evaporated lead or tin on the order of 5,000 A thick is then deposited upon the insulating layer 12. The entire sandwich structure is situated in a magnetic field perpendicular to the broad face of the sandwich, the magnetic field being supplied by magnetic field source 16. The entire sandwich is situated in a cryostat 18 and cooled below the transition temperature of the superconductors. A current $I_p$ from a source 17 is passed through the primary, and the sandwich behaves like a transformer since a potential difference which exists across the primary 10 is accompanied by a proportional potential difference across the secondary 14. The primary voltage may be sensed by a meter 19, and a meter 20 senses the potential difference across secondary 14. A magnetic field adjusting means 22 such as a variable current or voltage source is shown, variation of the magnetic flux varying the coupling between the primary 10 and the secondary 14 as will be explained.

The operation of the superconducting transformer is explained by assuming that the potential differences, $V_s$ and $V_p$, are produced by the motion of vortices across the respective superconductors. This concept is similar to that of the flux flow resistance proposed as the explanation for electrical resistance in Type II superconductors. According to this concept a transport current through a Type II superconductor in the mixed state exerts a force on the mixed state vortices causing them to move in the direction perpendicular to the transport current and the axis of the vortex. It is supposed that the motion of vortices produces a potential difference between two points in a superconductor which is proportional to the number of vortices passing between the two points per unit time independent of the force producing their motion. If flux flow resistance is assumed to occur in Type I superconductors as well, the operation of the transformer is explained by assuming that the close proximity of the secondary and primary causes vortices which are moved through the primary by the transport current to drag vortices through the secondary as well. A potential difference across the primary would therefore be accompanied by a potential difference across the secondary. The coupling between the primary and secondary is produced by the magnetic field of the vortices. For coupling to exist, the spacing between the primary and secondary must be of the order of the size of the intermediate state structure. Thus for Type I films of about 10,000 A, an insulator of a few thousand A should be used. For plates of centimeter thickness, insulators of millimeter thickness may be used. For a further discussion of the theory of operation, reference may be had to P. R. Solomon, Physics Review Letters 16,50 (1966).

Figure 2:
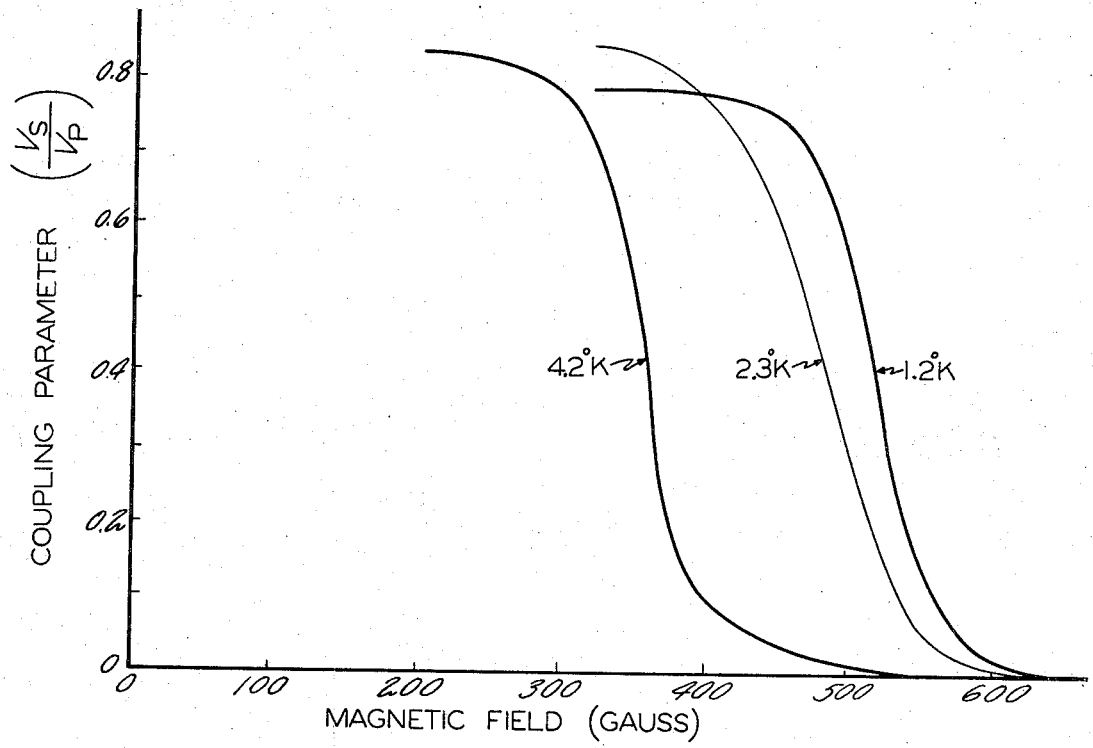
FIG. 2 shows the relationship between voltages and magnetic field in the embodiment of FIG. 1.

Typical data for a sandwich type transformer of the type shown in FIG. 1 in which the primary and secondary are made of lead are illustrated in FIG. 2 where is plotted the ratio of the secondary potential difference $V_s$ to the primary potential difference $V_p$ as a function of the applied magnetic field. At low magnetic fields the ratio is independent of the current in the primary and is equal to 1. At magnetic fields close to the superconducting critical field, the ratio is independent of the current in the primary and is equal to zero. For intermediate magnetic fields the ratio is relatively insensitive to the current in the primary, and goes continuously from zero to one. It is therefore evident that the strength of coupling between primary and secondary can be varied by simply varying the applied magnetic field. The intermediate state for a thin slab of lead begins with a magnetic field of essentially zero, and exists up to the critical field (Hc) which is well known for lead. For the temperatures shown in FIG. 2 the critical fields are: at 4.2°K, 550 gauss; at 2.3°K, 730 gauss; at 1.2°K, 785 gauss. These critical fields are listed in "Superconductivity" by D. Schoenberg, Cambridge Press (1960). The curves in FIG. 2 show actual experimental data for the coupling in a dc transformer. With respect to the above critical fields, it may be seen that the coupling ratio drops to zero before the critical field is reached.

Coupling has been observed in a variety of samples using Pb and Sn primaries and secondaries. They include samples having primary thicknesses between 1/40 mm. and 2 1/2 mm., an insulation thickness of 2,000 A and a secondary thickness between 1,000 A and 10,000 A. They also include samples having a primary thickness of about 1/4 mm. and an insulation thickness ranging from 500–20,000 A and a secondary thickness of between 1,000 A and 10,000 A. It is clear clear that the range of primary thickness may be extended without destroying the coupling by properly choosing the insulator and secondary thicknesses and the range of insulator thickness may be extended by properly choosing the primary and secondary thicknesses.

A potential difference across the secondary was also observed in a sample in which the secondary was wider than the primary. The only condition necessary for the observation of a potential difference across the secondary is that vortices move across the secondary.

Figure 3:
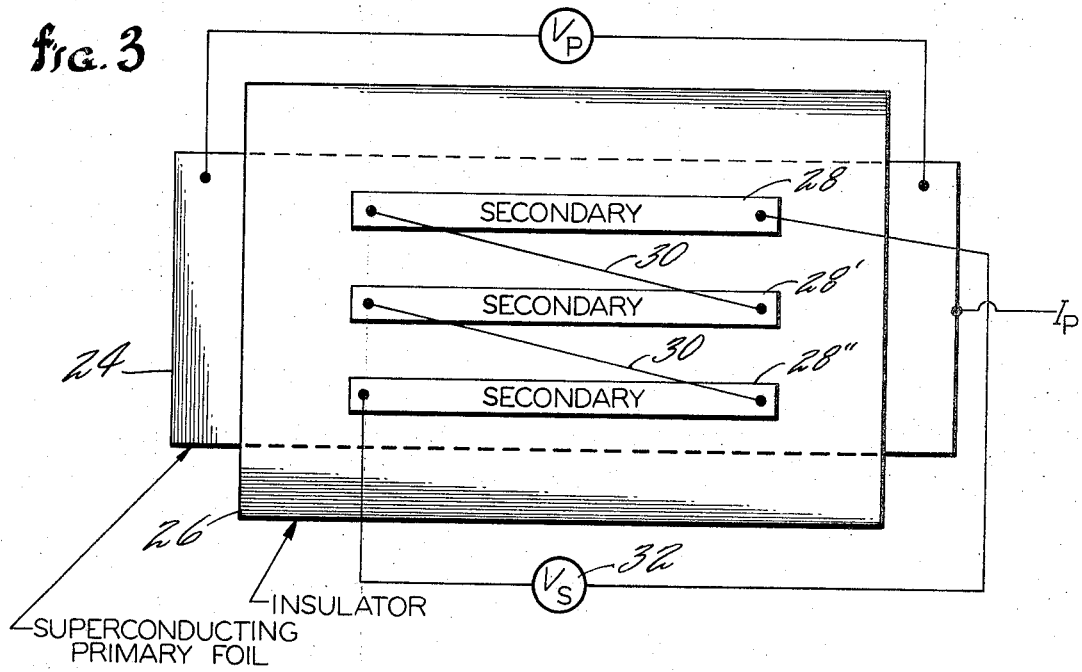
FIG. 3 shows a variation of FIG. 1 which produces a step-up transformer.

FIG. 3 shows a voltage step-up transformer. The sandwich consists of a primary 24, an insulator 26, and three secondary films 28, 28' and 28'', side by side. The secondaries are connected in series by means of wires 30. A voltmeter 32 is connected across the series connection of secondaries to sense the output voltage. While not shown, it is required that a magnetic field be applied at right angles to the broad face of the sandwich, and that the entire sandwich be cooled to superconducting temperatures. At low magnetic fields the potential drop across each secondary is equal to the potential drop across the primary. Connection of the three secondaries in series as shown gives a total potential difference three times larger than the potential difference across the primary.

I claim:

1. A variable coupling dc transformer capable of supplying a transformed direct current into a load comprising a first conductor comprising a foil of Type I superconducting material selected from the class consisting of lead and tin and which is capable of existing in the intermediate state, said first conductor having a thickness of between 1/40 mm. and 2 1/2 mm., a second conductor comprising a film of Type I superconducting material selected from the class consisting of lead and tin and which is capable of existing in the intermediate state, said second conductor having a thickness of between 1,000 A and 10,000 A, said first and second conductors being substantially parallel and separated from each other by a film of electrical insulating material having a thickness of between 500 A and 20,000 A, means for cooling said conductors below the transition temperature of the superconducting materials, means for generating an electrical current through said first conductor, means in addition to said electrical current for generating a magnetic field perpendicular to and coupling said first and second conductors, said magnetic field establishing both said conductors in the intermediate state, means for varying the strength of said magnetic field to vary the flux coupling between said conductors, and load means connected to said second conductor for utilizing a unidirectional voltage generated within said second element by the current flow in said first conductor.

2. Apparatus as in claim 1 in which said second conductor comprises a plurality of conductors electrically connected in series to produce a step-up voltage.

* * * * *